(12) United States Patent
Peker et al.

(10) Patent No.: US 9,893,763 B2
(45) Date of Patent: Feb. 13, 2018

(54) REVERSE POWER FEEDING POWER SOURCING EQUIPMENT AND METHOD

(71) Applicant: Microsemi P.O.E Ltd., Hod Hasharon (IL)

(72) Inventors: Arkadiy Peker, Glen Cove, NY (US); Alon Ferentz, Petach Tikva (IL); Ohad Vaknin, Ramat Gan (IL)

(73) Assignee: Microsemi P.O.E. Ltd., Hod Hasharon (IL)

( * ) Notice: Subject to any disclaimer, the term of this patent is extended or adjusted under 35 U.S.C. 154(b) by 0 days.

(21) Appl. No.: 15/627,466

(22) Filed: Jun. 20, 2017

(65) Prior Publication Data

US 2018/0006683 A1   Jan. 4, 2018

Related U.S. Application Data

(60) Provisional application No. 62/358,081, filed on Jul. 4, 2016.

(51) Int. Cl.
*H04M 1/24* (2006.01)
*H04M 3/08* (2006.01)
(Continued)

(52) U.S. Cl.
CPC ............ *H04B 3/44* (2013.01); *H04B 10/808* (2013.01); *H04L 12/10* (2013.01); *H04M 3/14* (2013.01); *H04M 19/02* (2013.01); *H04M 19/08* (2013.01)

(58) Field of Classification Search
None
See application file for complete search history.

(56) References Cited

U.S. PATENT DOCUMENTS 5,640,451 A   6/1997 Schopfer
5,802,170 A   9/1998 Smith et al.
(Continued)

FOREIGN PATENT DOCUMENTS

EP   1942600 A1   7/2008
EP   2120443 A1   11/2009
(Continued)

OTHER PUBLICATIONS

International Search Report for parallel PCT/IL2017/050685 dated Sep. 7, 2017 by European Patent Office.
(Continued)

*Primary Examiner* — Quoc D Tran
(74) *Attorney, Agent, or Firm* — Simon Kahn

(57) ABSTRACT

A reverse power feeding PSE in electrical communication with a DPU, the PSE constituted of: a control circuitry; and a detection and classification signal circuitry, arranged to: output a detection signal; output a classification signal; and output an additional signal exhibiting a voltage below an operating range, and wherein the control circuitry is arranged to: responsive to the output first detection signal, detect a valid signature resistance; responsive to the output first classification signal, receive a classification current and determine the class of the DPU; responsive to the output additional signal, detect the absence, or presence, of an off-hook phone; responsive to the detection of the absence of an off-hook phone, and further responsive to the detection of the valid signature resistance, output power exhibiting a voltage within the operating range; and responsive to the detection of the presence of an off-hook phone, not output power.

14 Claims, 7 Drawing Sheets

(51) Int. Cl.
  *H04M 3/22*   (2006.01)
  *H04B 3/44*   (2006.01)
  *H04M 3/14*   (2006.01)
  *H04L 12/10*  (2006.01)
  *H04M 19/08*  (2006.01)
  *H04B 10/80*  (2013.01)
  *H04M 19/02*  (2006.01)

(56) References Cited

U.S. PATENT DOCUMENTS

| | | |
|---|---|---|
| 6,157,716 A | 12/2000 | Ortel |
| 6,992,404 B2 | 1/2006 | Priest |
| 7,580,732 B2 | 8/2009 | Bailey |
| 8,552,589 B2 | 10/2013 | Ghosh |
| 8,601,289 B1 | 12/2013 | Smith et al. |
| 8,818,192 B1 | 8/2014 | Smith |
| 8,861,554 B1 | 10/2014 | Schneider |
| 8,963,367 B2 | 2/2015 | Melamed |
| 9,319,537 B2 | 4/2016 | Peker |
| 9,374,452 B2 * | 6/2016 | Peker ............. H04M 19/08 |
| 9,380,152 B2 | 6/2016 | Joffe |
| 9,413,902 B2 * | 8/2016 | Cheng ............ H04L 12/10 |
| 9,571,669 B2 * | 2/2017 | Peker ............. H04L 12/10 |
| 9,640,998 B2 * | 5/2017 | Dawson ........... H02J 4/00 |
| 2004/0049321 A1 | 3/2004 | Lehr |
| 2007/0003053 A1 | 1/2007 | Mathoorasing |
| 2007/0116256 A1 | 5/2007 | Pongani et al. |
| 2010/0007334 A1 | 1/2010 | Apfel |
| 2011/0064212 A1 | 3/2011 | Cooper |
| 2012/0250840 A1 | 10/2012 | Joffe |
| 2012/0300817 A1 | 11/2012 | Smith |
| 2013/0251114 A1 | 9/2013 | Humphrey |
| 2014/0037077 A1 | 2/2014 | Marchetti |
| 2014/0314412 A1 | 10/2014 | Soto |
| 2015/0334226 A1 | 11/2015 | Peker et al. |
| 2016/0164687 A1 | 6/2016 | Cooper |
| 2016/0330334 A1 | 11/2016 | Cooper |

FOREIGN PATENT DOCUMENTS

| | | |
|---|---|---|
| EP | 2472792 A2 | 7/2012 |
| EP | 2835934 A1 | 2/2015 |

OTHER PUBLICATIONS

Written Opinion of the International Searching Authority for parallel PCT/IL2017/050685 dated Sep. 7, 2017 by European Patent Office.

Adtran Europe Limited; "An Enhancement for Combining RPF and POTS"; published by ETSI, TS 101 548 RPF; Submission Date Mar. 14, 2014.

Per Karlsson et al., "DC Bus Voltage Control for a Distributed Power System", IEEE Transaction on Power Electronics, vol. 18, No. 6, Nov. 2003, 8 pages, New York, NY.

"Access, Teminals, Transmission and Multiplexing (ATTM): Reverse Power Fee for Remote Nodes"; ETSI TR 629 V2.1.2, Mar. 1, 2011, 24 pages.

* cited by examiner

REVERSE POWER FEEDING POWER SOURCING EQUIPMENT AND METHOD

CROSS-REFERENCE TO RELATED APPLICATION

This application claims priority from U.S. Provisional Patent Application Ser. No. 62/358,081 filed Jul. 4, 2016, of the same title, the entire contents of which is incorporated herein by reference.

TECHNICAL FIELD

The invention relates generally to the field of reverse power feeding and particularly to a reverse power feeding power sourcing equipment (PSE) arranged to provide classification of a distribution point unit.

BACKGROUND

Various communication standards, such as digital subscriber line (xDSL), very-high-bit-rate digital subscriber line 2 (VDSL2), G.hn, and G.fast, have been proposed or developed to provide high-speed data transmission from the service provider (e.g., a central office) to a customer premise over the existing twisted-pair copper wiring conventionally used for telephone service. Such technologies leverage modem technology to increase the data transfer bandwidth of the twisted-pair copper wiring. Typically, modems are provided on the ends of the subscriber line copper wiring to communicate between the central office and the customer premise. The manner in which the two modems communicate is established by the particular standard governing the communication. Because the existing telephone wire is used, the data signals are typically transferred out-of band with the voice band signals. Because different frequencies are used for the voice band and the data band, voice and data information can be concurrently transferred over the twisted-pair copper line.

Service providers have increased data bandwidth by installing fiber optic cabling between the central office (CO) and a distribution point unit (DPU) closer to the customers. A particular DPU may interface with a bundle of twisted pairs to service a relatively small number of customer premise connections. This approach shortens the length of the copper pair between the CO interface at the DPU and the customer, thereby allowing increased data rates. Thus the DPU will provided telephony and/or data to one or more customer premises equipment (CPE)

One difficulty arising from an optical connection between the central office and the DPU lies in the inability to provide a source of power for the DPU. Due to the remoteness of the DPU with respect to the central office, a local power supply is often unavailable or expensive to install.

Power for a DPU may be provided by reverse power feeding, wherein power is supplied to the DPU from the various CPEs for which telephony and/or data services are provided from the DPU. A standard for reverse power feeding is being standardized by ETSI and the Broadband World Forum. In such an embodiment, a power supply in the DPU may combine power contributions from multiple CPEs to power a main distribution unit (MDU) that handles the voice and data communication. This arrangement is referred to as a reverse power system, since the CPEs are the power sourcing equipment (PSE) and the DPU, particularly the MDU, is the powered device (PD).

The CPE PSE thus injects power across the copper pair. In order to use a plain old telephony service (POTS) type analog telephone, a POTS adaptor is to be installed between the copper pair and the POTS telephone. FIG. 1 illustrates a high level block diagram of such a reverse power feeding arrangement 10, reverse power feeding arrangement 10 comprising a DPU 20 and a CPE 30 connected by a copper pair 40, with certain standard ETSI symbols shown. DPU 20 comprise a data provision module 50, typically in optical communication with a CO; a DC extraction circuitry 60; a distribution point power supply 65; and a classification current circuitry 67. Data provision module 50 and DC extraction circuitry 60 are each connected to copper pair 40 past the U-O reference point. The U-O reference point is defined as the reference point at the DPU containing both DC power and service data. Distribution point power supply 65 is arranged to convert power received from DC extraction circuitry 60 to an appropriate power for data provision module 50, and other devices located within DPU 20. Classification current circuitry 67 is coupled to the output of DC extraction circuitry 60.

CPE 30 comprises a PSE 70, a power splitter 80, a service splitter 90, a POTSA-D adaptor 100 and a POTS telephone 110. PSE 70 is connected to power splitter 80 across the U-R2P reference point, defined as the reference point at CPE 30 containing the injected DC power. Power splitter 80 is connected to service splitter 90, which provides service and optionally analog phone service for CPE 30. Power splitter 80 is additionally connected to copper pair 40 across the U-R reference point, defined as the reference point at CPE 30 containing both DC power and service data. POTSA-D 100 is connected to copper pair 40 between power splitter 80 and the U-R reference point across the U-R2S reference point, defined as the CPE reference point containing the baseband POTS and the converted POTS signaling. POTSA-D 100 is an adapter that can be attached to one or more POTS telephones 110 in CPE 30. POTSA-D 100 is arranged to perform the following functions: translate the signals from the upstream DC and low frequency POTS signaling from the POTS telephone 110 into an in-band or out-of-band signaling system; translate the signals from the downstream in-band or out-of-band signaling system into POTS signaling towards the POTS telephone 110; and provide sufficient current, with a current limit, and DC voltage to supply POTS telephone 110.

In order to provide more efficient reverse power feeding, it is advantageous for PSE 70 to determine the class of DPU 20. Particularly, in a classification stage, PSE 70 is arranged to generate a classification voltage, which is presented to DPU 20, and classification current circuitry 67 is arranged to generate a classification current whose magnitude is indicative of the class of DPU 20. PSE 70 is then arranged, responsive to the magnitude of the received classification current, to determine the class of DPU 20 and adjust the current limit accordingly.

In the event that POTS telephone 110 is mistakenly connected to the reverse power feeding network without POTSA-D 100, i.e. POTS telephone 110 is mistakenly connected directly to the in-premises wiring at the potential of reference point U-R, when POTS telephone 110 is off-hook it draws a current from PSE 70. If POTS telephone 110 goes off-hook during, or before, the classification stage of DPU 20, PSE 70 will read the combination of the classification current and the current drawn by POTS telephone 110, instead of just the classification current. As a result, PSE 70 will read an incorrect current magnitude, which may alter the perceived class of DPU 20. For example, in one embodiment classification current circuitry 67 is arranged to generate, in response to a classification voltage of 14.5-20.5 V: a classification current of 9-12 mA for a class 1 DPU 20; a classification current of 17-20 mA for a class 2 DPU 20; and a classification current of 26-30 mA for a class 3 DPU 20. Assuming DPU 20 is a class 2, classification current circuitry 67 will thus output during the classification stage a classification current with a magnitude of 17-20 mA. If an off-hook POTS telephone 110 is represented by a resistor and zener diode circuit of 7.5 V and 1 kΩ, and PSE 70 generates a classification signal with a voltage of 17.5 V, then the off-hook current of POTS telephone 110 will be: (17.5V−7.5V)/1 kΩ=10 mA. Thus, instead of reading a classification current with a magnitude of 17-20 mA, PSE 70 will read a current of 27-30 mA and mistakenly determine that DPU 20 is a class 3 instead of a class 2. PSE 70 will thus provide the wrong current limit for DPU 20 and may also violate safety regulations which are set for class 2 devices.

SUMMARY OF THE INVENTION

Accordingly, it is a principal object of the present invention to overcome at least some of the disadvantages of prior art reverse power systems. This is accomplished in one embodiment by a reverse power feeding PSE in electrical communication with a DPU, the PSE comprising: a power output terminal; a control circuitry; and a detection and classification signal circuitry, wherein said detection and classification signal circuitry is arranged, responsive to said control circuitry, to: output a first detection signal exhibiting a voltage within a detection range; output a first classification signal exhibiting a voltage within a classification range; and output an additional signal, said additional signal exhibiting a voltage below an operating range, and wherein said control circuitry is arranged to: responsive to said output first detection signal, detect a valid signature resistance presented to said power output terminal; responsive to said output first classification signal, receive a first classification current at said power output terminal; responsive to said received first classification current, determine the class of the DPU; responsive to said output additional signal, detect the absence, or presence, of an off-hook phone coupled to said power output terminal; responsive to said detection of the absence of an off-hook phone, and further responsive to the detected valid signature resistance, output at said power output terminal power from the power source, said output power exhibiting a voltage within the operating range; and responsive to said detection of the presence of an off-hook phone, not output at said power output terminal power from the power source.

In one further embodiment, the detection of the absence, or presence, of an off-hook phone comprises detection of an electrical attribute of the power output terminal. In another further embodiment, the output additional signal comprises a second detection signal exhibiting a voltage within the predetermined detection range, wherein the off-hook phone absence detection comprises detection of a valid signature resistance presented to the power output terminal, and wherein the off-hook phone presence detection comprises detection of a non-valid signature resistance presented to the power output terminal.

In one further embodiment, the off-hook phone absence detection comprises detection of an absence of an off-hook current at the power output terminal, and the off-hook phone presence detection comprises detection of a presence of an off-hook current at the power output terminal. In one yet further embodiment, the voltage of the output additional signal is below the predetermined classification range.

In one further embodiment, the output additional signal comprises a second classification signal exhibiting a voltage within the predetermined classification range, and the control circuitry is further arranged to: receive a second classification current at the output power terminal; and compare the magnitude of the received second classification current with the magnitude of the received first classification current, wherein the off-hook phone absence detection is responsive to the outcome of the comparison indicative that the magnitude of the received second classification current is equal to the magnitude of the received first classification current, and wherein the off-hook phone presence detection is responsive to the outcome of the comparison indicative that the magnitude of the received second classification current is not equal to the magnitude of the received first classification current. In one yet further embodiment, the detection and classification signal circuitry is further arranged, responsive to the control circuitry, to output a second detection signal exhibiting a voltage within the predetermined detection range, wherein the off-hook phone absence detection further comprises, responsive to the output second detection signal, detection of a valid signature resistance presented to the power output terminal, and wherein the off-hook phone presence detection further comprises, responsive to the output second detection signal, detection of a non-valid signature resistance presented to the power output terminal.

Independently, the embodiments enable a reverse power feeding powering method, the method comprising: outputting a first detection signal exhibiting a voltage within a predetermined detection range; responsive to the output first detection signal, detecting a valid signature resistance; outputting a first classification signal exhibiting a voltage within a predetermined classification range; responsive to the output first classification signal, receiving a first classification current; responsive to the received first classification current, determine the class of a distribution point unit (DPU) in electrical communication with a terminal of a power sourcing equipment (PSE); outputting an additional signal, the additional signal exhibiting a voltage below a predetermined operating range; responsive to the output additional signal, detecting the absence, or presence, of an off-hook phone coupled to the terminal of the PSE; responsive to the detection of the absence of an off-hook phone, and further responsive to the valid signature resistance detection, outputting power from a power source responsive to the determined class, the output power exhibiting a voltage within the predetermined operating range; and responsive to the detection of the presence of an off-hook phone, not outputting power from the power source.

In one further embodiment, the detection of the absence, or presence, of an off-hook phone comprises detecting an electrical attribute of the PSE terminal. In another further embodiment, the output additional signal comprises a second detection signal exhibiting a voltage within the detection range, wherein the off-hook phone absence detection comprises detecting a valid signature resistance presented to the PSE, and wherein the off-hook phone presence detection comprises detecting a non-valid signature resistance presented to the PSE.

In one further embodiment, the off-hook phone absence detection comprises detecting an absence an off-hook current at the PSE terminal, and the off-hook phone presence detection comprises detecting a presence of an off-hook current at the PSE terminal. In one yet further embodiment, the voltage of the output additional signal is below the predetermined classification range.

In one further embodiment, the output additional signal comprises a second classification signal exhibiting a voltage within the classification range, wherein the method further comprises: receiving a second classification current; and comparing the magnitude of the received second classification current with the magnitude of the received first classification current, wherein the off-hook phone absence detection is responsive to the outcome of the comparison indicative that the magnitude of the received second classification current is equal to the magnitude of the received first classification current, and wherein the off-hook phone presence detection is responsive to the outcome of the comparison indicative that the magnitude of the received second classification current is not equal to the magnitude of the received first classification current. In one yet further embodiment, the method comprises outputting a second detection signal exhibiting a voltage within the detection range, wherein the off-hook phone absence detection further comprises, responsive to the output second detection signal, detecting a valid signature resistance presented to the PSE, and wherein the off-hook phone presence detection further comprises, responsive to the output second detection signal, detecting a non-valid signature resistance presented to the PSE.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. The term 'resistor' as used herein is meant to include, without limitation, any suitable element providing electrical resistance. The term 'inductor' as used herein is meant to include, without limitation, any suitable element providing electrical inductance. The term 'capacitor' as used herein is meant to include, without limitation, any suitable element providing electrical capacitance. In the accompanying drawings.

DETAILED DESCRIPTION OF THE PREFERRED EMBODIMENTS

Figure 1:
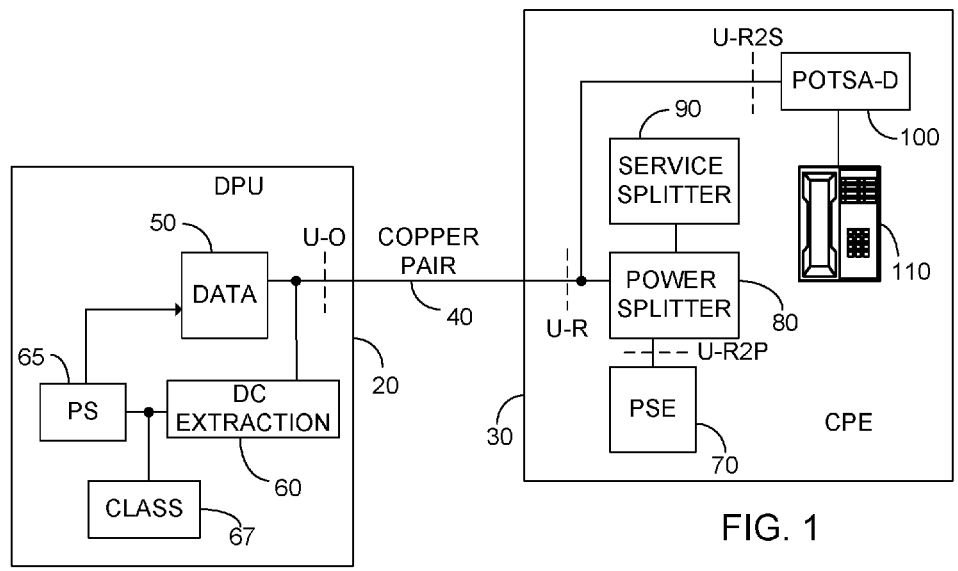
FIG. 1 illustrates a high level block diagram of a reverse power feeding arrangement according to the prior art, with a telephone connected through a POTS adapter.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2A:
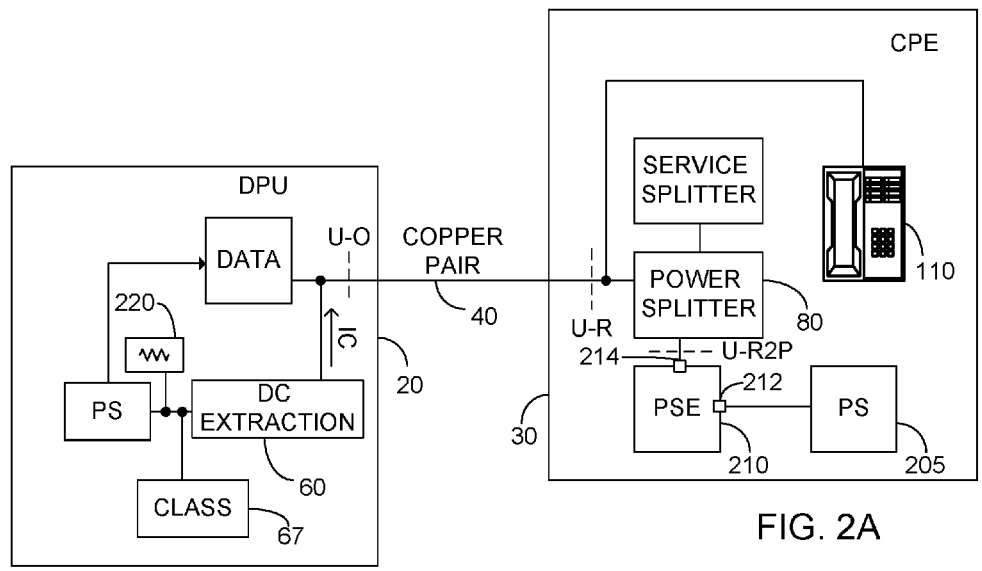
FIG. 2A illustrates a high level block diagram of a first embodiment of a reverse power feeding arrangement, according to certain embodiments.
Figure 2B:
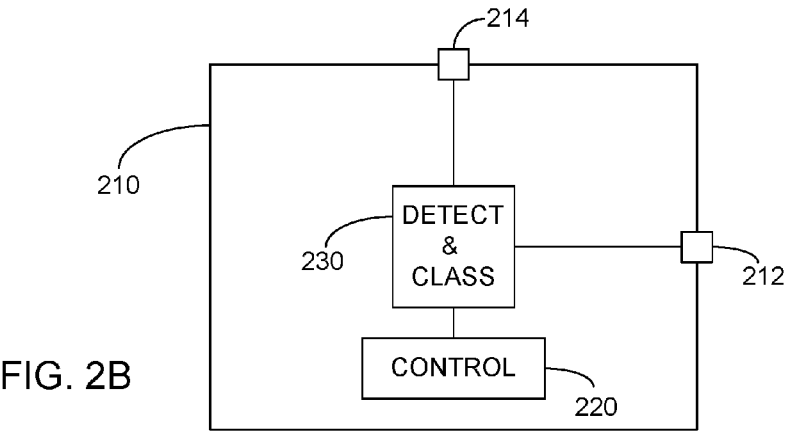
FIG. 2B illustrates a high level block diagram of a PSE of FIG. 2A, according to certain embodiments.

FIG. 2A illustrates a high level block diagram of a reverse power feeding arrangement 200, according to certain embodiments. Reverse power feeding arrangement 200 is in all respects similar to reverse power feeding arrangement 10, with the exception that PSE 70 is replaced with PSE 210, CPE 30 further comprises a CPE power supply 205 and DPU 20 further comprises a sense resistance circuitry 220 coupled to the output of DC extraction circuitry 60. Additionally, CPE 30 is illustrated without a POTS A-D 100 and POTS telephone 110 is connected directly to power splitter 80 in accordance with the error condition described above. FIG. 2B illustrates a high level block diagram of components of PSE 210, FIGS. 2A-2B being described together. PSE 210 comprises: a power input terminal 212; a power output terminal 214; a control circuitry 225; and a detection and classification signal circuitry 230. Control circuitry 225 and detection and classification signal circuitry 230 are illustrated as separate units, however this is not meant to be limiting in any way and they may be combined in a single circuitry, without exceeding the scope.

A respective input of detection and classification signal circuitry 230 is coupled to power input terminal 212 and a respective output of detection and classification signal circuitry 230 is coupled to power output terminal 214. Control circuitry 225 is also coupled to detection and classification signal circuitry 230. As illustrated in FIG. 2A, power input terminal 212 is coupled to an output of CPE power supply 205 and power output terminal 214 is coupled to power splitter 80.

Figure 3A:
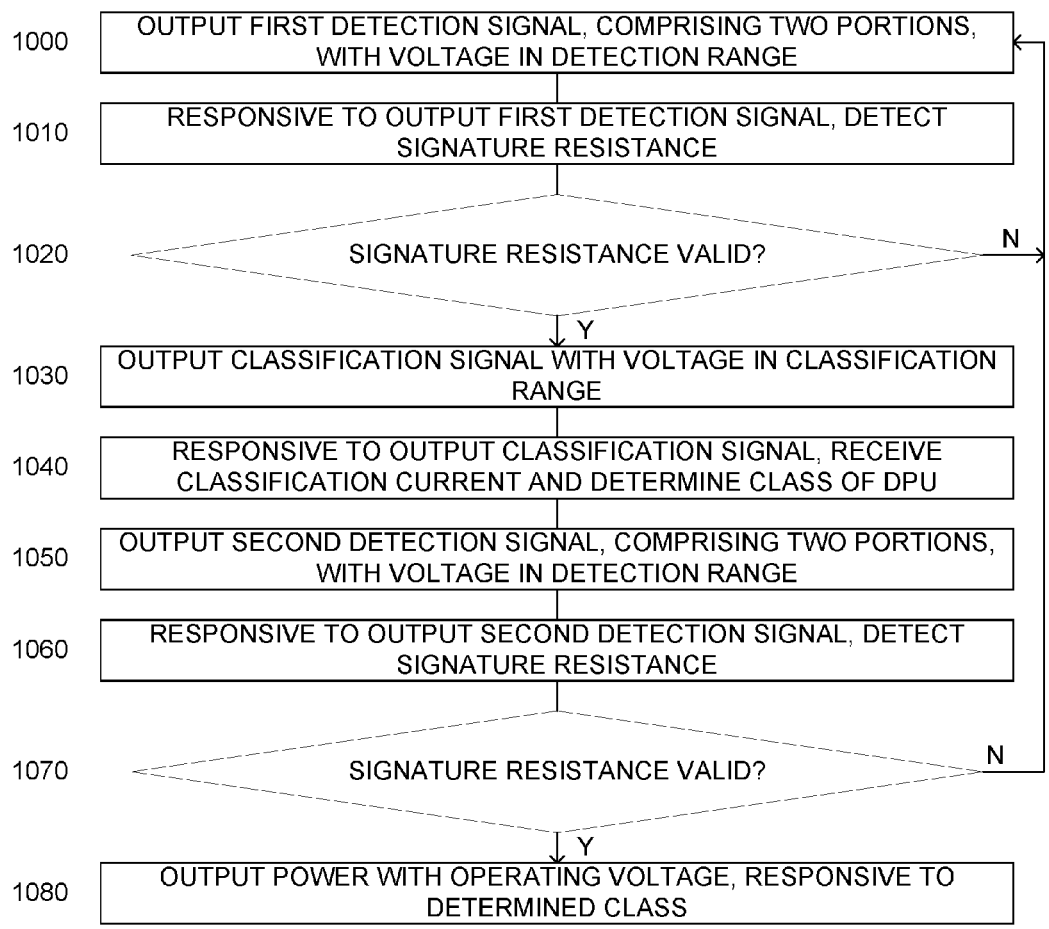
FIG. 3A illustrates a high level flow chart of a first method of operation of the PSE of FIG. 2B, according to certain embodiments.
Figure 3B:
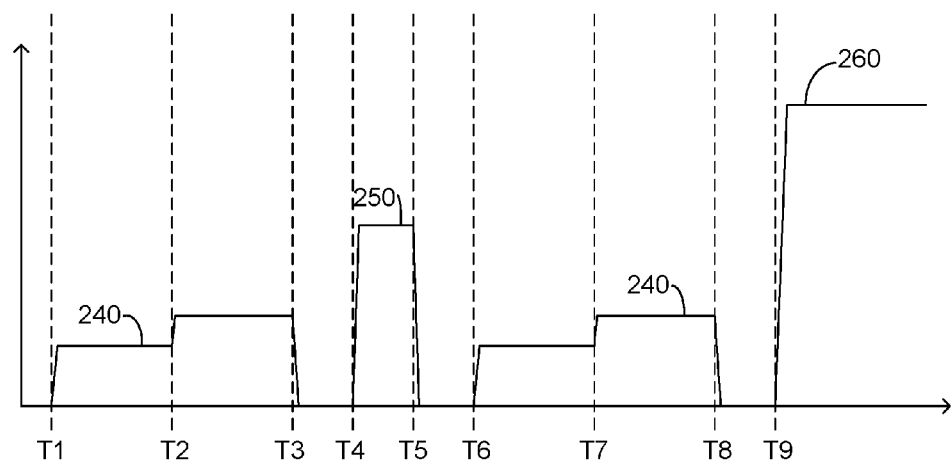
FIG. 3B illustrates a graph of signal waveforms of the first method of FIG. 3A.
Figure 4A:
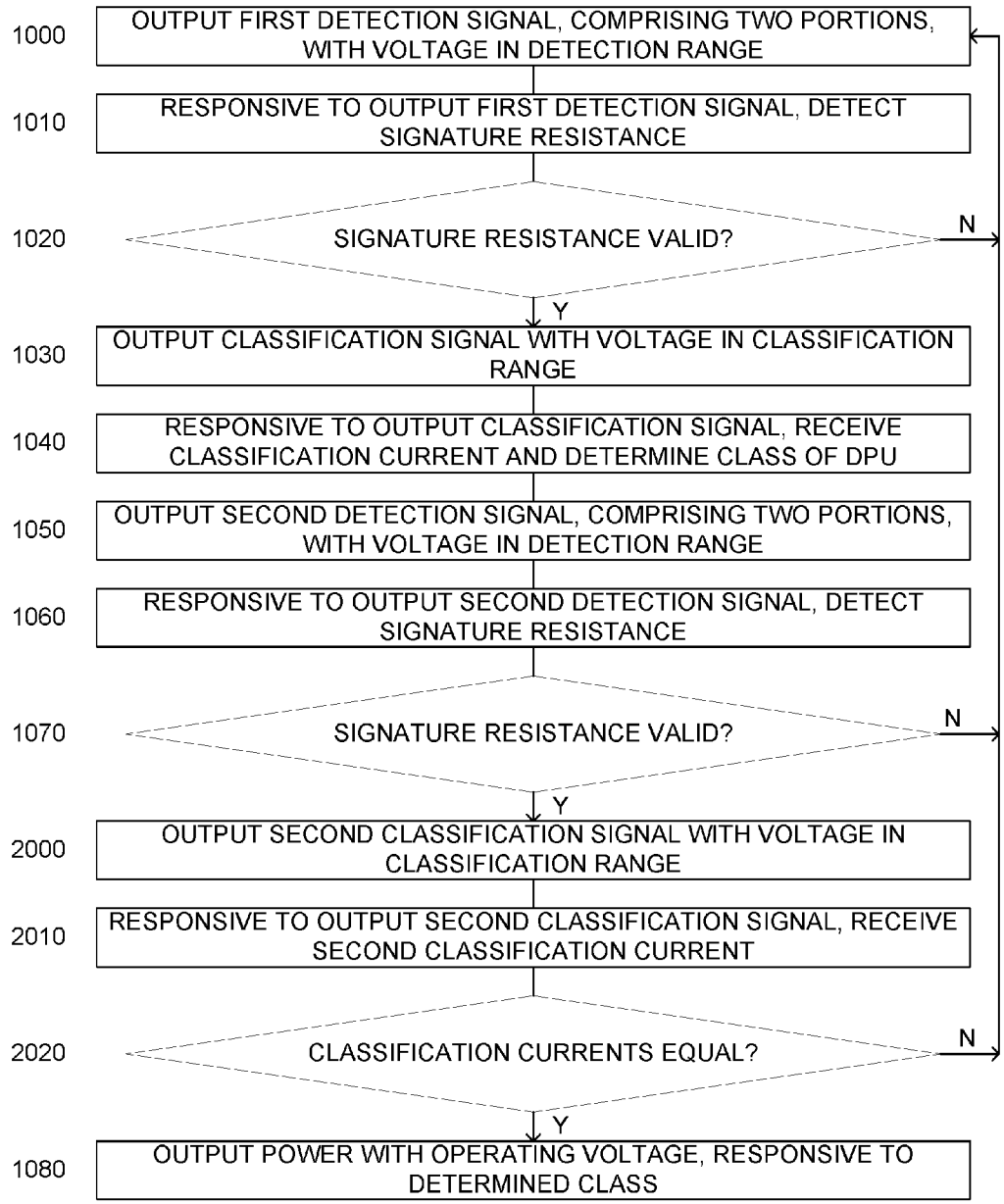
FIG. 4A illustrates a high level flow chart of a second method of operation of the PSE of FIG. 2B, according to certain embodiments.
Figure 4B:
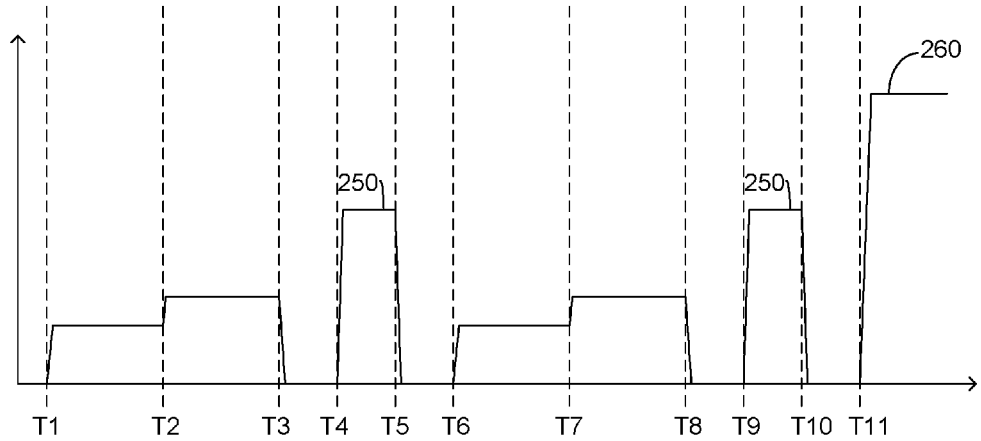
FIG. 4B illustrates a graph of signal waveforms of the second method of FIG. 4A.
Figure 5A:
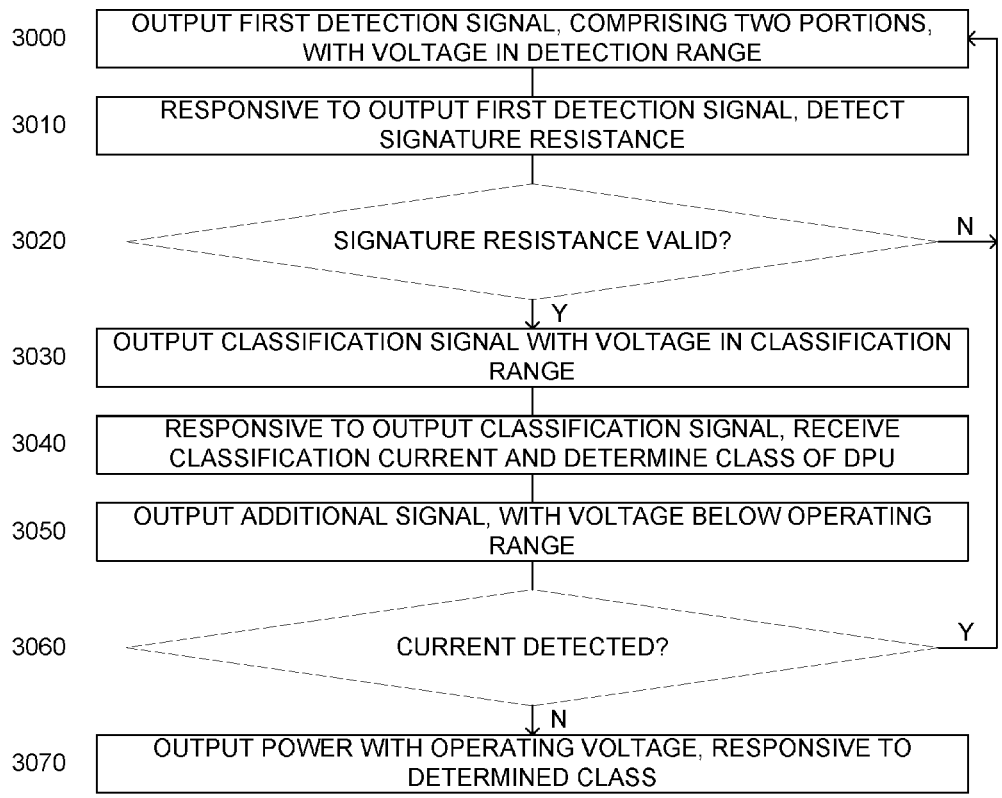
FIG. 5A illustrates a high level flow chart of a third method of operation of the PSE of FIG. 2B, according to certain embodiments.
Figure 5B:
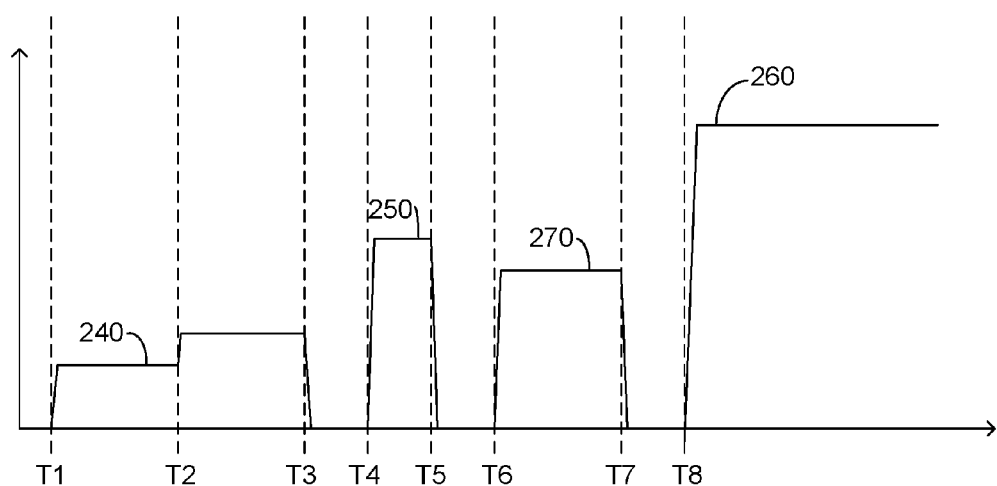
FIG. 5B illustrates a graph of signal waveforms of the first method of FIG. 3A.

In operation, PSE 210 is arranged to provide power to DPU 20 from CPE power supply 205, responsive to at least one detection and classification stage, as will be described below. Particularly, FIG. 3A illustrates a high level flow chart of a first method of operation of PSE 210 and FIG. 3B illustrates a graph of waveforms of the first method of PSE 210, wherein the x-axis represents time in arbitrary units and the y-axis represents voltage in arbitrary units. FIG. 4A illustrates a high level flow chart of a second method of operation of PSE 210 and FIG. 4B illustrates a graph of waveforms of the second method of PSE 210, wherein the x-axis represents time in arbitrary units and the y-axis represents voltage in arbitrary units. FIG. 5A illustrates a high level flow chart of a third method of operation of PSE 210 and FIG. 5B illustrates a graph of waveforms of the third method of PSE 10, wherein the x-axis represents time in arbitrary units and the y-axis represents voltage in arbitrary units.

In stage 1000 of FIG. 3A, at time T1 of FIG. 3B, detection and classification signal circuitry 230 is arranged to output a first detection signal 240, exhibiting a voltage within a predetermined detection range, preferably 2.7-10 V. At time T2, detection and classification signal circuitry 230 is arranged to change the voltage of first detection signal 240, while remaining within the predetermined detection range. At time T3, detection and classification signal circuitry 230 ceases output of first detection signal 240. The detection of stage 2000 is illustrated as exhibiting two voltage levels, however this is not meant to be limiting in any way, and more than 2 voltage levels may be utilized without exceeding the scope. In stage 1010, responsive to the output of first detection signal 240, control circuitry 225 is arranged to determine the resistance of sense resistance circuitry 220 which is presented to PSE 210, optionally by measuring the magnitude of the current generated by first detection signal 240 across the resistance of sense resistance circuitry 220. In one embodiment, the resistance of sense resistance circuitry 220 is presented only responsive to a signal exhibiting a voltage within the predetermined detection range. As a result, at time T3 the resistance is no longer presented to PSE 210, optionally by opening a switch coupled to a resistor providing the resistance. In stage 1020, control circuitry 225 is arranged to determine whether the determined resistance of stage 1010, i.e. the signature resistance of DPU 20, is a valid signature resistance, preferably 19-26.5 kΩ.

In the event that the signature resistance of DPU 20 is valid, in stage 1030, at time T4, detection and classification signal circuitry 230 is arranged to output a classification signal 250 exhibiting a voltage within a classification range, preferably 14.5-20.5 V. In stage 1040, responsive to the output classification signal 250 of stage 1030, classification current circuitry 67 of DPU 20 is arranged to generate and output a classification current, denoted IC. The magnitude of classification current IC is indicative of the class of DPU 20. Classification current IC is received by detection and classification signal circuitry 230 and control circuitry 225 is arranged to determine the class of DPU 20, i.e. the amount of power requested by DPU 20, in accordance with the magnitude of classification current IC. At time T5, detection and classification signal circuitry 230 ceases output of classification signal 250.

In stage 1050, at times T6 and T7, detection and classification signal circuitry 230 is arranged to output a second detection signal 240, as described above in relation to stage 1000, the output of second detection signal 240 being ceased by detection and classification signal circuitry 230 at time T8. In stage 1060, as described above in relation to stage 1010, control circuitry 225 is again arranged to again detect the signature resistance of DPU 20 as described above in relation to stage 1010. In stage 1070, control circuitry 225 is arranged to determine whether the detected signature resistance of stage 1060 is valid, as described above in relation to stage 1020. In the event that the detected signature resistance is valid, in stage 1080, at time T9, control circuitry 225 is arranged to output operating power 260 to DPU 20, via power splitter 80, operating power 260 exhibiting a voltage within a predetermined operating range, preferably 44-57 V. Control circuitry 225 is further arranged to control the output of operating power 260 in accordance with the determined class of DPU 20, as determined in stage 1040. In one embodiment, operating power 260 is output via detection and classification signal circuitry 230 and in another embodiment operating power 260 is output via a separate circuitry. In the event that either stage 1020 or stage 1070 does not find a valid detected signature resistance, stage 1000 is repeated, preferably after a pre-determined time interval.

In the event that after the detection of stages 1000-1010, i.e. after time T3, POTS telephone 110 goes off-hook, POTS telephone 110 will draw a current from PSE 210 during the detection phase, as described above. As a result, the detected signature resistance of stage 1060 will not be valid, operating power 260 will not be output and stage 1000, as described above, is again performed. As described above, an off-hook POTS telephone 110 can cause an error in the detection of the class of DPU 20 and the second detection phase of stages 1050-1070 thus advantageously keeps PSE 210 from outputting operating power 260 with the wrong class information. Similarly, in the event that in stage 1020, the determined signature resistance of stage 1010 is determined to not be valid, stage 1000 is again performed.

The method of FIG. 4A is in all respects similar to the method of FIG. 3A, with the exception that subsequent to stage 1070, detection and classification signal circuitry 230 is arranged to perform a second classification stage, as illustrated in FIG. 4B. Particularly, in stage 2000, at time T9, detection and classification signal circuitry 230 is further arranged to output a second classification signal 250 exhibiting a voltage within the predetermined classification range. In stage 2010, as described above in relation to stage 1040, responsive to the output second classification signal 250 of stage 2000, classification current circuitry 67 of DPU 20 is arranged to generate and output classification current IC. At time T10, detection and classification signal circuitry 230 ceases output of second classification signal 250. Classification current IC is received by detection and classification signal circuitry 230. For ease of understanding, classification current IC of stage 1040 is denoted IC1 and classification current IC of stage 2010 is denoted IC2. In stage 2020, control circuitry 225 is arranged to compare the magnitude of the received classification current IC2 of stage 2010 with the magnitude of the received classification current IC1 of stage 1040. In the event that the magnitudes of classification currents IC1 and IC2 are equal, in stage 1080, at time T11, control circuitry 225 is arranged to output operating power 260 to DPU 20, as described above. In the event that in stage 2020 the magnitudes of classification currents IC1 and IC2 are not equal, stage 1000 is again performed, preferably after a pre-determined delay. When classification currents IC1 and IC2 are unequal it is indicative that POTS telephone 110 has gone off-hook between the two classification stages 1040, 2010, and thus the classification information may be inaccurate.

As described above, FIG. 5A illustrates a third method of operation of PSE 210. In stage 3000, at time T1 of FIG. 5B, detection and classification signal circuitry 230 is arranged to output a first detection signal 240, exhibiting a voltage within the predetermined detection range. At time T2, detection and classification signal circuitry 230 is arranged to change the voltage level of first detection signal 240, while remaining within the predetermined detection range. At time T3, detection and classification signal circuitry 230 ceases output of first detection signal 240. In stage 3010, responsive to the output of first detection signal 240, control circuitry 225 is arranged to determine the resistance of sense resistance circuitry 220 which is presented to PSE 210, optionally by measuring the magnitude of the current generated by first detection signal 240 across the resistance of sense resistance circuitry 220. In this embodiment, the resistance of sense resistance circuitry 220 is presented only responsive to a signal exhibiting a voltage within the predetermined detection range. As a result, at time T3 the resistance is no longer presented to PSE 210, optionally by opening a switch coupled to a resistor providing the resistance. In stage 3020, control circuitry 225 is arranged to determine whether the determined resistance of stage 3010, i.e. the signature resistance of DPU 20.

In the event that the signature resistance of DPU 20 is valid, in stage 3030, at time T4, detection and classification signal circuitry 230 is arranged to output a classification signal 250 exhibiting a voltage within a classification range, preferably 14.5-20.5 V. In stage 3040, responsive to the output classification signal 250 of stage 1030, classification current circuitry 67 of DPU 20 is arranged to generate and output a classification current, denoted IC. The magnitude of classification current IC is indicative of the class of DPU 20. Classification current IC is received by detection and classification signal circuitry 230 and control circuitry 225 is arranged to determine the class of DPU 20 in accordance with the magnitude of classification current IC. At time T5, detection and classification signal circuitry 230 ceases output of classification signal 250.

In stage 3050, at time T6, detection and classification signal circuitry 230 is arranged to output an additional signal 270, the output of additional signal 270 ceased at time T7. The voltage of additional signal 270 is less than an operating range of 44-57 V and greater than the predetermined detection range of stage 3000 so as not to activate sense resistance circuitry 220. In one embodiment, the voltage of additional signal 270 is less than the predetermined classification range of stage 3030 so as not to activate classification current circuitry 67. In another embodiment, classification current circuitry is only initiated for a single instance responsive to activation of sense resistance circuitry 220, thus the voltage of additional signal 270 can be within the predetermined classification range without triggering operation of classification current circuitry 67. In stage 3060, control circuitry 225 is arranged to detect whether a current is being drawn from PSE 210. Particularly, in the event that an off-hook POTS telephone 110 is coupled to PSE 210, POTS telephone 110 will be drawing current from PSE 210 responsive to additional signal 270. In the event that POTS telephone 110 is not off-hook, there should be no current drawn since sense resistance circuitry 220 and classification current circuitry 67 are not active. Thus, if no current draw is detected by control circuitry 225 responsive to additional signal 270, in stage 3070 control circuitry 225 is arranged to output operating power 260 exhibiting a voltage within the predetermined operating range, as illustrated at time T8. Additionally, the output operating power 260 is provided in accordance with the determined DPU class of stage 3040. In the event that in stage 3060 an a current draw is detected by control circuitry 225 responsive to additional signal 270, or in the event that in stage 3020 the signature resistance is invalid, stage 3000 is repeated, preferably after a predetermined delay.

Figure 6:
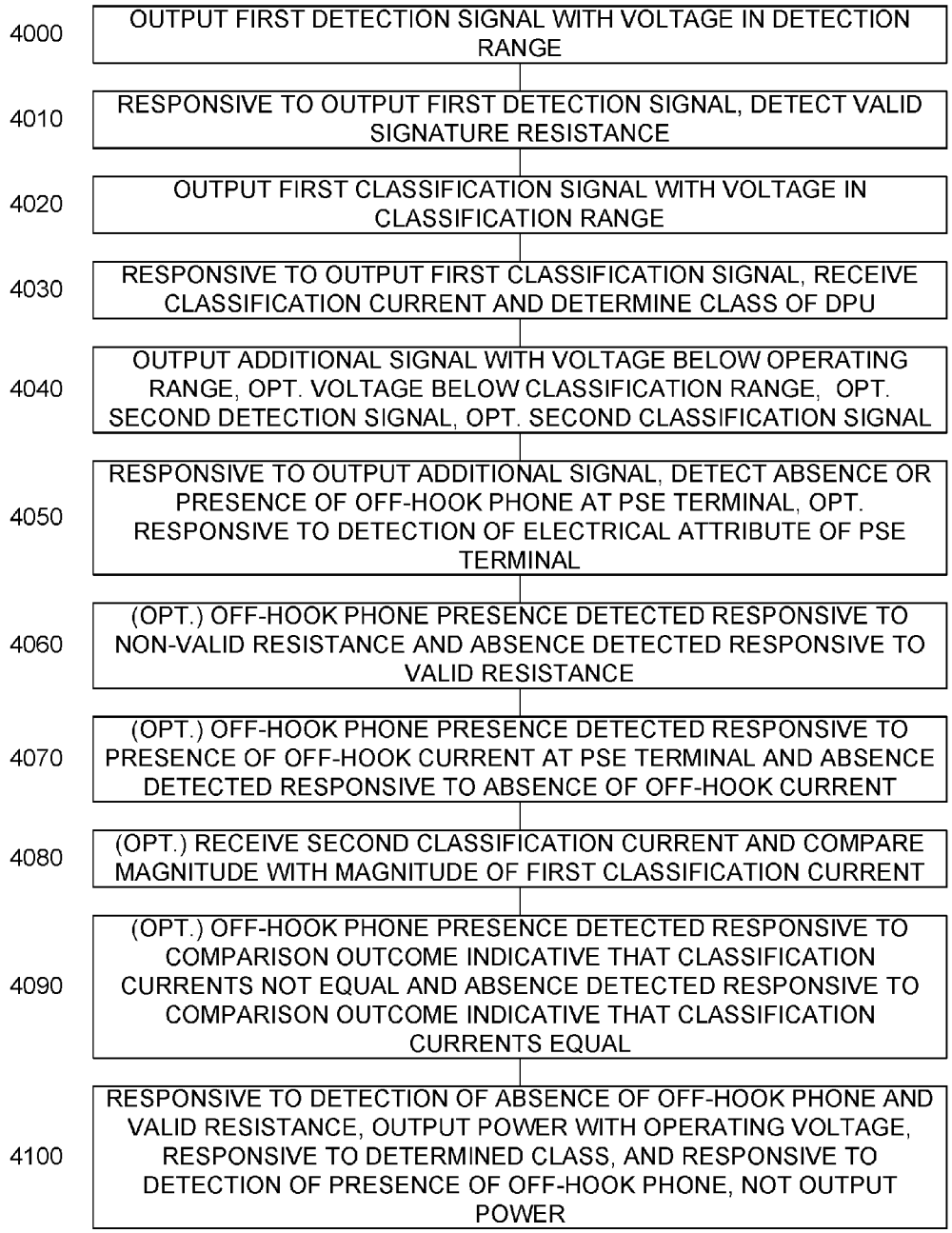
FIG. 6 illustrates a high level flow chart of a reverse power feeding method, according to certain embodiments.

FIG. 6 illustrates a high level flow chart of a reverse power feeding method, according to certain embodiments.

In stage 4000, a first detection signal is output at a terminal of a PSE, the first detection signal exhibiting a voltage within a predetermined detection range, preferably 2.7-10 V, preferably at a plurality of voltage levels over the period of detection. In stage 4010, responsive to the output first detection signal of stage 4000, a valid signature resistance is detected. In stage 4020, a first classification signal is output at the terminal of the PSE of stage 4000, the first classification signal exhibiting a voltage within a predetermined classification range, preferably 14.5-20.5 V. In stage 4030, responsive to the output first classification signal of stage 4020, a classification current is received at the PSE. Responsive to the received classification current, the class of a DPU in electrical communication with the PSE is determined.

In stage 4040, an additional signal is output at the terminal of the PSE of stage 4000, the additional signal exhibiting a voltage below a predetermined operating range, in one embodiment below 44 V. In one embodiment, as will be described below, the voltage of the additional signal is below the classification range of stage 4020. In another embodiment, as will be described below, the additional signal is a second detection signal. In another embodiment, as will be described below, the additional signal is a second classification signal.

In stage 4050, responsive to the output additional signal of stage 4040, the absence, or presence, of an off-hook POTS phone coupled to the PSE terminal of stage 4000 is detected. Optionally, an electrical attribute presented to the PSE terminal is detected, the absence and presence of the off-hook POTS phone detected responsive to the electrical attribute detection, as will be described below in relation to optional stages 4060-4090.

In optional stage 4060, the additional signal of stage 4040 is a second detection signal, and the absence of an off-hook POTS phone is detected responsive to the detection of a valid signature resistance presented to the PSE terminal of stage 4000 during output of the second detection signal. Similarly, the presence of an off-hook POTS phone is detected responsive to the detection of a non-valid signature resistance presented to the PSE terminal during output of the second detection signal.

In optional stage 4070, the presence of an off-hook POTS phone is detected responsive to the detection of an off-hook current at the PSE terminal of stage 4000 during output of the additional signal of stage 4040. Particularly, as described above, no current is being drawn by the DPU and thus if a current is present it is indicative of an off-hook POTS phone directly connected to the power line. The absence of an off-hook POTS phone is detected responsive to the detection of the absence of a current draw from the PSE terminal during output of the additional signal.

In optional stage 4080, the additional signal of stage 4040 is a second classification signal and a second classification current is received at the PSE terminal of stage 4000 responsive to the output of the second classification signal. Optionally, the second classification signal is output subsequent to a second detection phase. The magnitude of the second classification current is compared with the magnitude of the classification current received in stage 4030. Additionally, in optional stage 4090, the presence of an off-hook POTS phone is detected responsive to the outcome of the comparison of optional stage 4080 indicative that the magnitude of the received classification current of optional stage 4080 is not equal to the magnitude of the received classification current of stage 4030. The absence of an off-hook POTS phone is detected responsive to the outcome of the comparison of optional stage 4080 indicative that the magnitude of the received classification current of optional stage 4080 is equal to the magnitude of the received classification current of stage 4030.

In stage 4100, responsive to the detection of the absence of an off-hook POTS phone in stage 4050 and optional stages 4060-4090, and further responsive to the detection of the valid signature resistance of stage 4010, operating power is output at the PSE terminal of stage 4000, the output operating power exhibiting a voltage within the operating range, preferably 44-57 V. Additionally, the operating power is output in accordance with the determined DPU class of stage 4030. Alternately, responsive to the detection of the presence of an off-hook POTS phone, or responsive to the detection of a non-valid signature resistance of stage 4010, operating power is not output at the PSE terminal.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A reverse power feeding powering sourcing equipment (PSE) in electrical communication with a power source and a distribution point unit (DPU), the PSE comprising:
a power output terminal;
a control circuitry; and
a detection and classification signal circuitry coupled to said power output terminal,
wherein said detection and classification signal circuitry is arranged, responsive to said control circuitry, to:
output a first detection signal exhibiting a voltage within a predetermined detection range;
output a first classification signal exhibiting a voltage within a predetermined classification range; and
output an additional signal, said additional signal exhibiting a voltage below a predetermined operating range, and wherein said control circuitry is arranged to:
responsive to said output first detection signal, detect a valid signature resistance presented to said power output terminal;
responsive to said output first classification signal, receive a first classification current at said power output terminal;
responsive to said received first classification current, determine the class of the DPU;
responsive to said output additional signal, detect the absence, or presence, of an off-hook phone coupled to said power output terminal;
responsive to said detection of the absence of an off-hook phone, and further responsive to said valid signature resistance detection, output at said power output terminal power from a power source responsive to said determined class, said output power exhibiting a voltage within the predetermined operating range; and
responsive to said detection of the presence of an off-hook phone, not output at said power output terminal power from the power source.

2. The PSE of claim 1, wherein said detection of the absence, or presence, of an off-hook phone comprises detection of an electrical attribute of said power output terminal.

3. The PSE of claim 1, wherein said output additional signal comprises a second detection signal exhibiting a voltage within the predetermined detection range,
wherein said off-hook phone absence detection comprises detection of a valid signature resistance presented to said power output terminal, and
wherein said off-hook phone presence detection comprises detection of a non-valid signature resistance presented to said power output terminal.

4. The PSE of claim 1, wherein said off-hook phone absence detection comprises detection of an absence of an off-hook current at said power output terminal, and
wherein said off-hook phone presence detection comprises detection of a presence of an off-hook current at said power output terminal.

5. The PSE of claim 4, wherein the voltage of said output additional signal is below the predetermined classification range.

6. The PSE of claim 1, wherein said output additional signal comprises a second classification signal exhibiting a voltage within the predetermined classification range,
wherein said control circuitry is further arranged to:
receive a second classification current at said output power terminal; and
compare the magnitude of said received second classification current with the magnitude of said received first classification current,
wherein said off-hook phone absence detection is responsive to the outcome of said comparison indicative that the magnitude of said received second classification current is equal to the magnitude of said received first classification current, and
wherein said off-hook phone presence detection is responsive to the outcome of said comparison indicative that the magnitude of said received second classification current is not equal to the magnitude of said received first classification current.

7. The PSE of claim 6, wherein said detection and classification signal circuitry is further arranged, responsive to said control circuitry, to output a second detection signal exhibiting a voltage within the predetermined detection range, wherein said off-hook phone absence detection further comprises, responsive to said output second detection signal, detection of a valid signature resistance presented to said power output terminal, and wherein said off-hook phone presence detection further comprises, responsive to said output second detection signal, detection of a non-valid signature resistance presented to said power output terminal.

8. A reverse power feeding powering method, the method comprising:

outputting a first detection signal exhibiting a voltage within a predetermined detection range;

responsive to said output first detection signal, detecting a valid signature resistance;

outputting a first classification signal exhibiting a voltage within a predetermined classification range;

responsive to said output first classification signal, receiving a first classification current;

responsive to said received first classification current, determine the class of a distribution point unit (DPU) in electrical communication with a terminal of a power sourcing equipment (PSE);

outputting an additional signal, said additional signal exhibiting a voltage below a predetermined operating range;

responsive to said output additional signal, detecting the absence, or presence, of an off-hook phone coupled to the terminal of the PSE;

responsive to said detection of the absence of an off-hook phone, and further responsive to said valid signature resistance detection, outputting power from a power source responsive to said determined class, said output power exhibiting a voltage within the predetermined operating range; and responsive to said detection of the presence of an off-hook phone, not outputting power from the power source.

9. The method of claim 8, wherein said detection of the absence, or presence, of an off-hook phone comprises detecting an electrical attribute of the PSE terminal.

10. The method of claim 8, wherein said output additional signal comprises a second detection signal exhibiting a voltage within the detection range, wherein said off-hook phone absence detection comprises detecting a valid signature resistance presented to the PSE, and wherein said off-hook phone presence detection comprises detecting a non-valid signature resistance presented to the PSE.

11. The method of claim 8, wherein said off-hook phone absence detection comprises detecting an absence an off-hook current at the PSE terminal, and wherein said off-hook phone presence detection comprises detecting a presence of an off-hook current at the PSE terminal.

12. The method of claim 11, wherein the voltage of said output additional signal is below the predetermined classification range.

13. The method of claim 8, wherein said output additional signal comprises a second classification signal exhibiting a voltage within the classification range, wherein the method further comprises:

receiving a second classification current; and comparing the magnitude of said received second classification current with the magnitude of said received first classification current, wherein said off-hook phone absence detection is responsive to the outcome of said comparison indicative that the magnitude of said received second classification current is equal to the magnitude of said received first classification current, and wherein said off-hook phone presence detection is responsive to the outcome of said comparison indicative that the magnitude of said received second classification current is not equal to the magnitude of said received first classification current.

14. The method of claim 13, further comprising outputting a second detection signal exhibiting a voltage within the detection range, wherein said off-hook phone absence detection further comprises, responsive to said output second detection signal, detecting a valid signature resistance presented to the PSE, and wherein said off-hook phone presence detection further comprises, responsive to said output second detection signal, detecting a non-valid signature resistance presented to the PSE.

* * * * *